United States Patent [19]
Eguchi et al.

[11] Patent Number: 5,739,199
[45] Date of Patent: Apr. 14, 1998

[54] OPTICALLY TRANSPARENT ORGANOSILOXANE RESIN COMPOSITIONS

[75] Inventors: Katsuya Eguchi; Nobuo Kushibiki, both of Kanagawa Prefecture, Japan; Toshio Suzuki, Midland, Mich.

[73] Assignee: Dow Corning Asia, Ltd., Tokyo, Japan

[21] Appl. No.: 721,788

[22] Filed: Sep. 26, 1996

Related U.S. Application Data

[63] Continuation of Ser. No. 427,177, Apr. 21, 1995, abandoned.

[30] Foreign Application Priority Data

Apr. 21, 1994 [JP] Japan ................................ 6-83100

[51] Int. Cl.[6] ............................................. C08L 83/00
[52] U.S. Cl. ...................... 524/493; 524/588; 525/478
[58] Field of Search ............................ 525/478; 524/588, 524/493

[56] References Cited

U.S. PATENT DOCUMENTS 4,882,398  11/1989  Mbah ................................. 525/478

OTHER PUBLICATIONS

Handbook of Fillers and Reinforcements for Plastics, Van Nostrand Reinhold Co., pp. 138–143, 1978.

*Primary Examiner*—Ralph H. Dean
*Attorney, Agent, or Firm*—Larry A. Milco

[57] ABSTRACT

Cross-liked resins exhibiting a high level of optical transparency and little variation of refractive index with temperature are prepared using mixtures of two organosiloxane resins in combination with a reinforcing silica filler. The types and relative concentrations of hydrocarbon radicals in the resins are within specified limits to obtain the required optical properties and each resin contains groups that react with groups on the other resin to form a crosslinked network.

13 Claims, No Drawings

OPTICALLY TRANSPARENT ORGANOSILOXANE RESIN COMPOSITIONS

This application is a continuation of application Ser. No. 08/427,177 filed Apr. 21, 1995 which application is now abandoned.

BACKGROUND OF THE INVENTION

1. Field of the Invention

This invention relates to resin compositions used for optical and electro-optical elements. More particularly, this invention relates to organosiloxane resin compositions that can be cured to yield rigid, optically transparent crosslinked resins exhibiting an index of refraction within a specified range and little variation in refractive index with temperature.

2. Background Information

Transparent thermoplastic resins such as polymethyl methacrylate, polycarbonates, and non-crystalline polyolefins, and transparent thermosetting resins such as diethylene glycol bis-allyl carbonate (CR-39) and urethane base resins have been widely used as substitutes for glass in optical parts such as lenses and optical couplers. Organosiloxanes such as polydimethylsiloxane have excellent optical properties, and have been used in optical and electro-optic devices as coatings and as potting materials.

Silicone rubber is used for ophthalmic lenses, variable focus optical elements, and other applications where pliability is required in addition to the optical properties, and cured gels obtained after coating sols by the sol-gel method are widely used as hard coating materials.

Although organosiloxane-base materials are superior to organic resins in optical properties and environmental stability, because the sol compound is very difficult to mold into a definitive shape, the unmodified sol-gel type of coating material cannot be used for the fabrication of optical parts. On the other hand, although silicone rubber is excellent in transparency, it has the disadvantage of lacking rigidity because it is a rubber.

One property required of many materials intended for used as optical materials is a small variation in index of refraction with temperature. Most thermoplastic resins have a refractive index variation of about $1 \times 10^{-4}$/°C. Elastomeric materials have a variation of about $1 \times 10^{-3}$/°C., which is not necessarily limited to silicone rubber.

It is well known that the refractive index of a material matter is a function of its density, and range of density change with temperature exhibited by polyorganosiloxanes is large.

One objective of the present invention is to provide crosslinkable organosiloxane resin compositions which in the crosslinked form are as rigid as the conventional transparent non-crystalline thermoplastic resin, exhibit excellent optical transparency, a small variation of refractive index with temperature, and excellent moldability.

SUMMARY OF THE INVENTION

The objectives of the present invention are achieved by adjusting the type and concentration of silicon-bonded hydrocarbon radicals in the curable resin to achieve an excellent optical transparency and including a finely divided silica filler to impart rigidity.

DETAILED DESCRIPTION OF THE INVENTION

This invention provides a curable organosiloxane resin composition exhibiting optical transparency in the crosslinked state, said composition comprising A. a first organosiloxane resin comprising 1) at least two of a first reactive group per molecule and 2) siloxane units of the average formula $R_nSiO_{(4-n)/2}$, wherein each R is individually selected from the group consisting of alkyl radicals containing from 1 to 18 carbon atom, alkenyl and aryl radicals, and the value of n is greater than 0 and less than 2;

B. a second organosiloxane resin comprising at least two of a second reactive group per molecule which reacts with said first reactive group to form a crosslinked resin, and siloxane units of the average formula $R'_mSiO_{(4-m)/2}$, each R' is individually selected from the same group as R, and the value of m is greater than 0 and less than 2, and C. from 0.5 to 100 weight percent, based on the combined weights of said first and second resins, of a reinforcing silica exhibiting an average particle size of less than one micron.

The hydrocarbon radicals represented by R and R' and the values of m and n are preferably selected to provide a crosslinked resin exhibiting an index of refraction at a wavelength of 587.6 nm of from 1.410 to 1.460 and a variation of refractive index with temperature of less than $1 \times 10^{-3}$ per degree centigrade.

This invention also provides a method for preparing an crosslinked optically transparent silica-reinforced crosslinked organosiloxane resin, said method comprising the sequential steps of I. blending to homogeneity A. a first organosiloxane resin comprising 1) at least two of a first reactive group per molecule and 2) siloxane units of the average formula $R_nSiO_{(4-n)/2}$, wherein each R is individually selected from the group consisting of alkyl radicals containing from 1 to 10 carbon atom, alkenyl and aryl radicals, and the value of n is greater than 0 and less than 2;

B. a second organosiloxane resin comprising 1) at least two of a second reactive group per molecule which reacts with said first reactive group to form a crosslinked resin that is a solid at 25 degrees C., and 2) siloxane units of the average formula $R'_mSiO_{(4-m)/2}$, wherein each R' is individually selected from the same group as R, and the value of m is greater than 0 and less than 2, and C. from 0.5 to 100 parts by weight, based on the combined weights of said first and second resins, of a reinforcing silica exhibiting an average particle size of less than one micron.

II. curing said composition to yield an optically transparent crosslinked resin that is a solid at 25° C.

The inventive features of the present compositions are the types and relative concentrations of the hydrocarbon radicals, represented by R and R', in the two organosiloxane resins which will be referred to hereinafter as resins A and B. These parameters are responsible for the excellent optical transparency and small variation in refractive index with temperature. The silica filler supplies the required rigidity.

Organosiloxane Resins A and B

The hydrocarbon radicals represented by R and R' in resins A and B are alkyl containing from 1 to 18 carbon atoms, or a combination of alkyl radicals with alkenyl and/or aryl radicals. The concentration of these hydrocarbon radicals in an average siloxane unit are represented by n and m, respectively. When more than one hydrocarbon radical is present in a siloxane unit of resin A or B these can be identical or different. The hydrocarbon radicals can contain substituents such as halogen atoms and groups linked to silicon by oxygen, nitrogen or sulfur, with the proviso that these substituents do not interfere with crosslinking of resins A and B.

If the resins are to be crosslinked by a hydrosilation reaction, at least two of the R radicals in each molecule of resin A or two of the R' radicals in resin B are alkenyl such as vinyl, allyl or hexenyl, and the other resin contains at least two silicon-bonded hydrogen atoms per molecule, with the proviso that the sum of the average numbers of alkenyl radicals and silicon-bonded hydrogen atoms per molecule is greater than 4.

The preferred minimum values of m and n for a given combination of resin A and B are determined by the requirement that the refractive index is preferably between 1.410 and 1.460 using the D line of sodium (587.6 nm). As the values of m and/or n are increased by increasing the relative concentration of alkyl radicals in the siloxane units of the corresponding resins A and B, the index of refraction of the cured resin at a given wavelength will decrease.

If any of the hydrocarbon radicals represented by R and R' are aryl such as phenyl, the concentration of these radicals should preferably be below the value that will increase the refractive index of the crosslinked composition above 1.460.

Methods for preparing resins A and B are known, and are described in "Silicone Handbook" edited by Kunio Ito (Nikkan Kogyo Shinbun-sha, 1990), Chapter 12 and Chapter 13 (pages 466–515), or "The Latest Silicone Technology" edited by Makoto Kumada and Tadashi Wada (CMC, 1986), Chapter 3 (pages 80–96). These methods include the hydrolysis of mixtures containing the corresponding chlorosilanes or alkoxysilanes and continuing the reaction until the desired molecular weight is achieved.

The molecular weight of resins A and B is from 200 to 500,000 Some of these resins are liquids at 25° C. and others are solids. Preferably resins with viscosities in the liquid phase of from 10 to 100,000 cP (0.01 to 100 Pa.s), preferably from 100 10,000 cP (0.1 to 10 Pa.s) can be used.

Because casting is carried out in the molten state, if the viscosity is too high, the flow marks of the resin caused at the stage when the resin flows into the mold for casting are left in the moldings, and becomes the principal cause of birefringence. The molecular weight of resins exhibiting a viscosity below 10 cP (0.01 Pa.s) is too low for the crosslinked resin to exhibit acceptable levels of physical properties, particularly tensile and tear strength.

In the average formulae for resins A and B the values for n and m are preferably from 1.0 to 1.8, most preferably from 1.2 to 1.7, however these values are not limiting.

The weight ratio in which resins A and B are combined to prepare crosslinked resins is not particularly limited as long as the resultant mixture will form a crosslinked product. This ratio is typically from 0.5:1.0 to 1.0:0.5.

Resins A and B react with one another to form a crosslinked network. The range of molecular motion and the associated coefficient of thermal expansion exhibited by the resultant crosslinked structure are small compared to non-crosslinked resins, also referred to as thermoplastic resins. These properties are responsible for the small variation of refractive index with temperature exhibited by crosslinked resins prepared using the present compositions.

The reaction used to achieve crosslinking of the present compositions can be one of addition, condensation, or free radical reactions initiated either by the decomposition of organic peroxides or by exposure to electromagnetic radiation such as ultraviolet or visible light. Other types of reactions can be used so long as the optical properties of the crosslinked resin are not impaired.

For optical applications, hydrosilation reactions during which no low molecular compounds are generated as by-products are preferred because these reactions do not cause voids such as bubbles in the cured product. Hydrosilation reactions using platinum or compounds of platinum as the catalysts are particularly preferred.

The degree of crosslinking of the present compositions should be appropriate for the end-use application of the resin and the required levels of rigidity, strength, and pliability. It is preferred that the degree of crosslinking should be sufficient to achieve a solubility of less than 10 percent following immersion of the crosslinked resin in a good solvent for the non-crosslinked resins.

In addition to resin A, resin B and silica the present curable compositions can contain a catalyst for the crosslinking reaction. A preferred type of catalyst is the platinum-containing hydrosilation catalysts described in a preceding section of this specification. Preferred catalysts include but are not limited to platinum chloride, chloroplatinic acid, platinum-olefin complex, platinum-phosphine complex, platinum-vinylsiloxane complex, or solution of these. The concentration of catalyst is not particularly limited as long as it is sufficient for promoting crosslinking of the composition. From 0.01 weight % to about 3.0 weight % of catalyst, based on the combined weight of resins A and B is preferred.

The Reinforcing Silica

Because the crosslinked resin must be rigid to be used in the same manner as conventional thermoplastic resins, a finely divided form of silica is present in the compositions of this invention. The average particle size of the silica is 1 μm or less in order to minimize the light scattering by the particles, and preferably 0.1 μm or less to achieve high optical transparency.

It is known that the rigidity of a resin depends on the amount of reinforcing filler present.. While this is also true for the present compositions, the concentration of silica must not be so high as to adversely affect the optical transparency of the crosslinked resin. The concentration of silica is preferably from 0.5 to 100 weight percent, based on the combined weights of resins A and B, most preferably from 0.5 to 50 weight percent when transparency is the primary requirement.

Modification of the silica surface by treatment with a liquid or vaporized organosilicon compound in order to inhibit the secondary aggregation of the silica is a widely used method, and does not hinder practice of the present invention.

The method fox adding the silica to the resins is not critical. In accordance with one method, the silica is added to a solution of resins A and B in an organic solvent. The resin prepared in this manner is excellent in transparency and uniformity of refractive index in spite of the fact that the fine particles are dispersed in the system.

As used in this specification, transparency is defined as the percent transmittance of incident light with a wavelength of from 400 to 850 nm, measures using a visible-ultraviolet spectrometer. The transmittance of light within this wavelength range is preferably at least 70%, most preferably at least 75%, of the value obtained using air as the reference medium. Needless to say, the resin should not exhibit any absorption bands within this wavelength range.

Another characterizing feature of crosslinked resins prepared using the present compositions is a small variation of refractive index with temperature. This small variation is responsible for a small variation in focal-length and higher precision for optical systems containing optical elements formed from these resins.

Because it is extremely difficult to eliminate temperature-dependent variations of refractive index in the optical system by readjusting other elements in the system, it is extremely important for the optical resin to exhibit the smallest possible variation in refractive index with temperature.

As used in the present specification, the temperature dependency of the refractive index is defined as the change in the measured value of the refractive index using the D line of sodium that occurs with a specified change in temperature of the resin, not the value calculated from the thermal expansion coefficient of the resin using the known relationship between this property and refractive index.

The variation in refractive index with temperature exhibited by the crosslinked resins of this invention is typically about $1\times10^{-3}$ °C.$^{-1}$ or less. The variation for resins exhibiting high rigidity is as low as $1\times10^{-4}$ °C.$^{-1}$.

In order to reduce the temperature dependency of refractive index exhibited by a transparent non-crystalline polymer, the molecular motion of the molecular chain has to be restricted to reduce the freedom of motion. This is most effectively achieved by introducing crosslinks into the structure of the resin and by use of a filler that interacts with the resin, thereby restricting molecular motion, and reducing the temperature dependency of the refractive index.

An additional feature of crosslinked resins prepared using the present compositions is a reduction in water absorption to 0.1 weight % or less, based on the weight of the resin. As a result, water absorbed as water vapor does not form light scattering bodies due to condensation resulting from temperature changes, which is a characteristic phenomenon of silicone rubber.

Preferred curable compositions of this invention include but are not limited to the following:

1) As resin A, a copolymer containing the repeating units $(ViMe_2SiO_{1/2})_a(SiO_2)_b$, wherein Me is methyl, Vi is vinyl, and $0.2<a/b<2.0$.

As resin B, a copolymer containing the repeating units $(HMe_2SiO_{1/2})_c(SiO_2)_d$, wherein $0.2<c/d<2.0$.

A fumed silica wherein the surfaces of the particles have been treated to contain trimethylsilyl groups.

2) As resin A, a copolymer containing the repeating units $(ViMe_2SiO_{1/2})_a(Me_3SiO_{1/2})_b(SiO_2)_c$, wherein $0.2<(a+b)/c<2.0$.

As resin B, a copolymer containing the repeating units $(HMe_2SiO_{1/2})_c(Me_3SiO_{1/2})_d(SiO_2)_e$, wherein $0.2<(c+d)/e<2.0$)

As the reinforcing filler, colloidal silica.

3) As resin A, a copolymer containing the repeating units $(ViMe_2SiO_{1/2})_a(PhSiO_{3/2})_b$. Ph represents a phenyl radical and $0.1<a/b<1.0$.

As resin B, a copolymer containing the repeating units $(HMe_2SiO_{1/2})_c(PhSiO_{3/2})_d$ wherein $0.1<c/d<1.0$.

As the reinforcing filler, precipitated silica wherein the surface of the particles have been treated to introduce dimethylphenylsilyl groups.

Crosslinked resins prepared using the curable compositions of this invention are extremely superior in transparency in the visible region, and also, within the practical range of the optical material, exhibit a variation of refractive index with temperature that is almost one order less than the silicone resins currently used in optical applications. Consequently, by using the present resins one can fabricate optical systems exhibiting a higher precision than optical systems obtained using prior art silicone resins.

The following examples describe preferred resin compositions of this invention, and should not be considered as limitations on the scope of the invention as defined in the accompanying claims. Unless otherwise specified all parts and percentages in the examples are by weight and reported viscosity values were measured at 25° C.

REFERENCE EXAMPLE 1

Preparation of an SiH-Containing Resin 120 g of $(HMe_2Si)_2O$ and 624 g of $Si(OEt)_4$, wherein Et is ethyl, were charged into a reaction vessel and cooled to $-10°$ C. A solution prepared by blending 77 mL of 35% concentrated hydrochloric acid and 32 mL of water was then added dropwise to reaction mixture with stirring. Following completion of the addition, the reaction mixture was warmed to room temperature while stirring was continued. After neutralizing the reaction liquid by addition of a saturated aqueous solution of $NH_4Cl$, the reaction product was extracted with 800 mL of diethyl ether, following which a quantity of anhydrous $Na_2SO_4$ was added to remove water. Following removal of solids by filtration, the liquid was reacted with a mixture of 32.5 mL of $HMe_2SiCl$ and 26 mL of $(HMe_2Si)_2NH$ as described in the preceding section of this example. Concentration of the reaction product under reduced pressure yielded a colorless viscous polymer containing $—OSiMe_2H$ and $SiO_{4/2}$ as repeating units.

The average unit formula for the product could be expressed as $R^1_sSiO_{(4-s)/2}$, wherein s was about 1.3, $R^1$ represented a hydrogen atom or a methyl radical and each molecule contained 2 or more units of $HMe_2SiO_{1/2}$ in a molecule. The viscosity of the copolymer was 3,300 cP (3.3 Pa.s) at 70° C.

REFERENCE EXAMPLE 2

Synthesis of a vinyl-containing resin 58 g of $ViMe_2Si)_2O$, 70 g of water, 44 g of ethanol, and 18 mL of a 35% aqueous hydrochloric acid solution were charged into a glass reactor and heated to between 40° and 50° C. with stirring. 144 g of $Si(OEt)_4$ were then added dropwise to the reaction mixture with stirring. Following completion of the addition the reaction product was extracted with hexane, and the extracted liquid was dried with $Na_2SO_4$. Condensation of the resultant liquid phase under reduced pressure yielded a colorless viscous polymer.

The final product was a copolymer that can be represented by the average formula $R^2_tSiO_{(4-t)/2}$ wherein t was about 1.5, $R^2$ was vinyl or methyl group, and the copolymer contained at least two $ViMe_2SiO_{1/2}$ units in a molecule. The viscosity of the copolymer product was 3,800 cP at 70° C.

COMPARISON EXAMPLE 1

This example demonstrates the higher variation in refractive index with temperature when the reinforcing silica is omitted from the curable resin composition.

100 parts by weight of the copolymer prepared as described in Reference example 1 and 140 parts by weight of the copolymer prepared as described in Reference Example 2 were blended to homogeneity, at which time 0.05 weight percent, based on the total weight of the two copolymers of a platinum catalyst was added. The resultant composition was poured into a V block prism mold measuring 1 cm along each side, and cured by heating it at 60° C. for 3 hours followed by 10 hours of heating at 150° C. for 10 hours.

The refractive index of the prism was measured at 23° C. using a wavelength of 587.6 nm and a precision refractometer model KPR-2 manufactured by Kalnew Optical Industrial Co., Ltd. The center value of the refractive index was 1.41282, the Abbe's number was 53.3, and the distribution width of the refractive index, determined by the peak width at the half of the maximum value, was $1 \times 10^{-4}$.

The refractive index was also measured by varying the measurement temperature from 20° C. to 50° C., and the temperature dependency of refractive index was found to be $5 \times 10^{-4}$/°C. The transmittance of the resin composition was also measured using a plate sample 0.5 cm thick prepared by the same procedure used to prepare the prism. The plate exhibited 86% transmittance at 380 nm, and 91% in the range of from 400 to 850 nm.

EXAMPLE 1

A curable resin composition containing the types and amounts of the two resins described in Comparison Example 1 with the addition of 10 parts by weight of a finely divided silica available as Aerosil OX-50 from Nippon Aerosil Co. Ltd. with an average particle size of 50 nm prepared and crosslinked. The refractive index of the crosslinked resin was measured using the test procedures described in Comparison example 1. The refractive index was 1.43011, the Abbe's number was 55.7. The distribution width of the refractive index, determined by measuring the peak width at the half of the maximum value was $1 \times 10^{-4}$, and the measurement of the refractive index showed the temperature dependency of refractive index to be $2 \times 10^{-4}$/°C. The transmittance for the light with a wavelength in the range of 400 to 850 nm was 90%.

That which is claimed is:

1. A curable organosiloxane resin composition, curable to a rigid resin which exhibits optical transparency in the crosslinked state, said composition comprising
    A. a first organosiloxane resin comprising 1) at least two of a first reactive group per molecule and 2) siloxane units of the average formula $R_nSiO_{(4-n)/2}$, wherein each R is individually selected from the group consisting of alkyl radicals containing from 1 to 18 carbon atoms, alkenyl and aryl radicals, and the value of n is greater than 0 and less than 2;
    B. a second organosiloxane resin comprising at least two of a second reactive group per molecule which reacts with said first reactive group to form a crosslinked resin, and siloxane units of the average formula $R'_mSiO_{(4-m)/2}$, wherein each R' is individually selected from the same group as R, and the value of m is greater than 0 and less than 2, and
    C. from 0.5 to 100 weight percent, based on the combined weights of said first and second resins, of a reinforcing silica exhibiting an average particle size of less than one micron.

2. A curable organosiloxane resin composition according to claim 1 wherein the hydrocarbon radicals represented by R and R' and the values of m and n provide a crosslinked resin exhibiting an index of refraction at a wavelength of 587.6 nm of from 1.410 to 1.460 and a variation of refractive index with temperature of less than $1 \times 10^{-3}$ per degree centigrade.

3. A resin composition according to claim 1, wherein n and m are each greater than 1 and less than 1.8, each R and R' in each of said units is individually selected from the group consisting of methyl, phenyl and vinyl radicals and the viscosity of said first and second resins is from 10 to 100,000 cP (0.01 to 100 Pa.s) within the temperature range wherein said resins are liquid.

4. A resin composition according to claim 3 wherein each molecule of said first resin contains two or more alkenyl radicals and each molecule of said second resin contains two or more silicon-bonded hydrogen atoms.

5. A resin composition according to claim 4, wherein the crosslinked resin obtained by curing said composition exhibits a transmittance of at least 70 percent for light in the range from 400 nm to 850 nm and a variation of refractive index with temperature of less than $10^{-3}$ per degree Centigrade.

6. A resin composition according to claim 1, wherein the viscosity of said first resin is from 100 to 10,000 cP (0.1 to 10 Pa.s).

7. A resin composition according to claim 1, wherein the viscosity of said second resin is from 100 to 10,000 cP (0.1 to 10 Pa.s).

8. A method for preparing an crosslinked, optically transparent organosiloxane resin, said method comprising the sequential steps of
    I. blending to homogeneity
        A. a first organosiloxane resin comprising 1) at least two of a first reactive group per molecule and 2) siloxane units of the average formula $R_nSiO_{(4-n)/2}$, wherein each R is individually selected from the group consisting of alkyl radicals containing from 1 to 18 carbon atom, alkenyl and aryl radicals, and the value of n is greater than 0 and less than 2;
        B. a second organosiloxane resin comprising 1) at least two of a second reactive group per molecule which reacts with said first reactive group to form a crosslinked resin that is a solid at 25 degrees C., and 2) siloxane units of the average formula $R'_mSiO_{(4-m)/2}$, wherein each R' is individually selected from the same group as R, and m is selected from the same group as n, and
        C. from 0.5. to 100 parts by weight, based on the combined weights of said first and second resins, of a reinforcing silica exhibiting an average particle size of less than one micron,
    II. curing said composition to yield an optically transparent crosslinked resin that is a solid a 25° C.

9. A method according to claim 8 wherein the hydrocarbon radicals represented by R and R' and the values of m and n are selected to achieve a crosslinked resin exhibiting an index of refraction at a wavelength of 587.6 nm of from 1.410 to 1.460 and a variation of the refractive index with temperature of less than $1 \times 10^{-3}$ per degree centigrade.

10. A method according to claim 8, wherein n and m are each greater than 1 and less than 1.8, each R and R' in each of said units is individually selected from the group consisting of methyl, phenyl and vinyl radicals and the viscosity of said first and second resins is from 10 to 100,000 cP (0.01 to 100 Pa.s) within the temperature range wherein said resins are liquid.

11. A method according to claim 10 wherein each molecule of said first resin contains two or more alkenyl radicals and each molecule of said second resin contains two or more silicon-bonded hydrogen atoms.

12. A method according to claim 11, wherein the crosslinked resin obtained by curing said composition exhibits a transmittance of at least 70 percent for light in the range from 400 nm to 850 nm and a variation of refractive index with temperature of less than $10^{-3}$ per degree centigrade.

13. A resin composition according to claim 7, wherein the viscosity of said first resin is from 100 to 10,000 cP (0.1 to 10 Pa.s).

* * * * *